Feb. 3, 1925.                                        1,524,909
W. P. BUCHAN
GRAIN SEPARATOR
Filed April 18, 1923      2 Sheets-Sheet 1
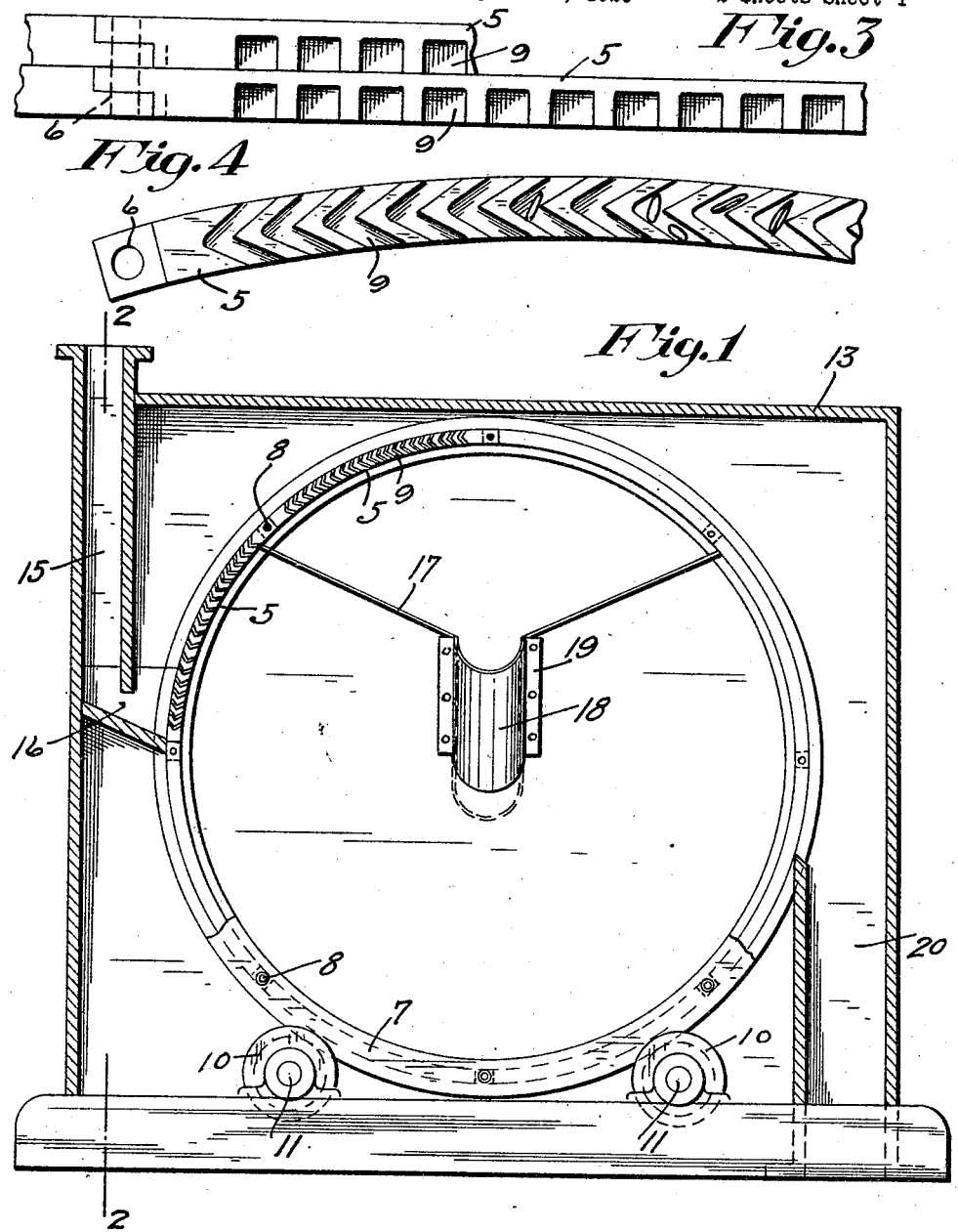
Inventor
William P. Buchan
By his Attorneys

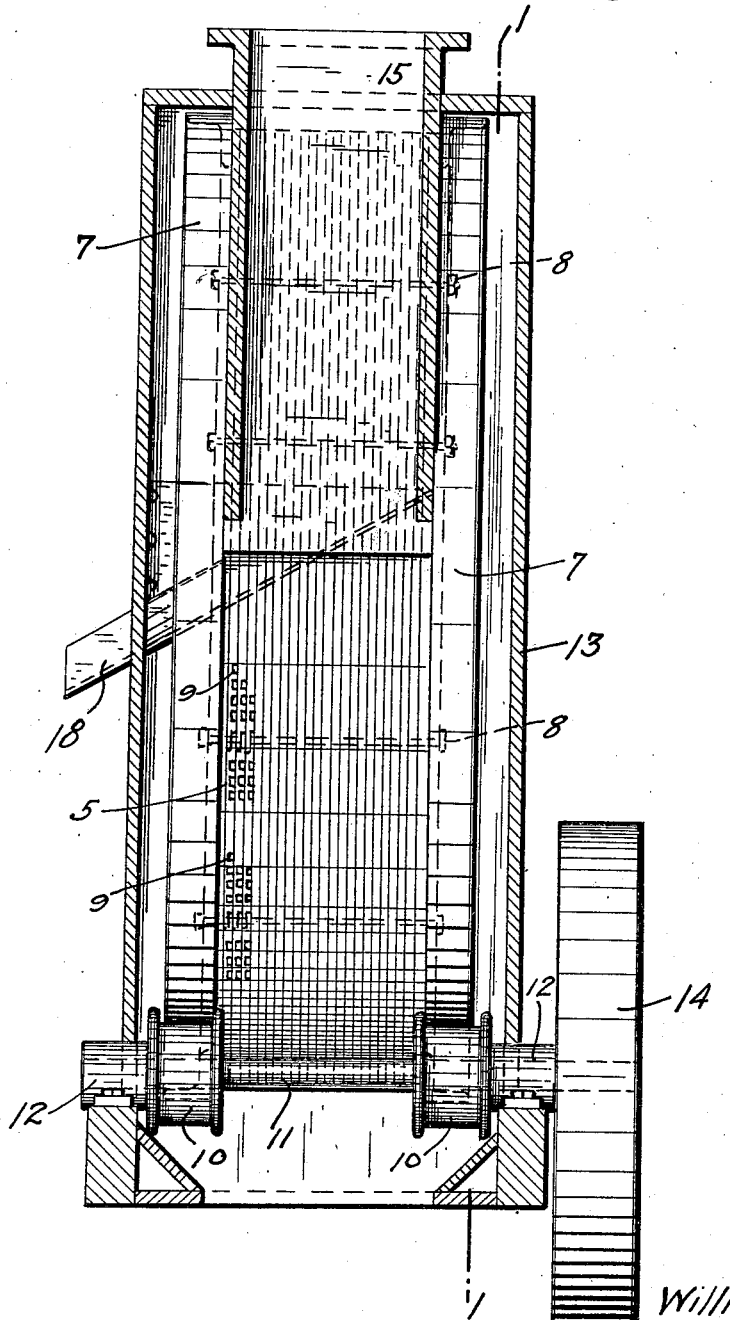

Patented Feb. 3, 1925.

1,524,909

UNITED STATES PATENT OFFICE.

WILLIAM P. BUCHAN, OF MINNEAPOLIS, MINNESOTA.

GRAIN SEPARATOR.

Application filed April 18, 1923. Serial No. 632,994.

*To all whom it may concern:*

Be it known that I, WILLIAM P. BUCHAN, a citizen of the United States, residing at Minneapolis, in the county of Hennepin and State of Minnesota, have invented certain new and useful Improvements in Grain Separators; and I do hereby declare the following to be a full, clear, and exact description of the invention, such as will enable others skilled in the art to which it appertains to make and use the same.

Broadly, my invention provides an improved separator for the separation of various different objects having different dimensions, such as difference of length but approximately the same diameter, so that the one class of objects will pass and the other will not pass through angular or approximately V-shaped passages; and this invention involves an arrangement wherein a separating shell or plate, provided with the annular or approximately V-shaped passages, is arranged to move and, under movement, to alternately reverse its surfaces in respect to top and bottom.

Particularly, the invention has for its object to provide a separator of the above type adapted for the efficient separation of wheat and oats, and, in its approved form, the separator shell having the angular passages therein is in the form of a cylindrical drum arranged to rotate in a constant direction.

The commingled wheat and oats, frequently designated as "succotash", is delivered against the perforated separator surface at the exterior thereof and on the rising side of the drum. Within the drum is a hopper or receptacle to receive the wheat, and at the exterior of the downwardly moving side of the drum, there is preferably an outer hopper to receive the oats. In a machine for the separation of wheat and oats, both wheat and oats will be picked up by the angular passages and as they are carried up, the wheat will, under the action of gravity, be worked through the passages and will fall into the inner hopper while the oats, because of their length, will not go through the angular passages but will be carried thereby until the perforated shell has been turned approximately upside down and will then be discharged outward and into the outer hopper or receptacle.

The machine illustrated in the drawings may be assumed to be designed for the separation of wheat and oats, and in said drawings, like characters indicate like parts throughout the several views.

Referring to the drawings:

Fig. 1 is a longitudinal vertical section taken through the separator approximately on the line 1—1 of Fig. 2;

Fig. 2 is a transverse vertical section taken on the line 2—2 of Fig. 1;

Fig. 3 is a fragmentary plan view showing several of the sections that make up the separating drum or cylinder; and Fig. 4 is a side elevation of one of the drum sections, the parts thereof being broken away.

The separating drum, for convenience in manufacture, is preferably made up of a multiplicity of laterally spaced cylindrical rings, each ring comprising a plurality of segmental sections 5 having reduced perforated ends 6 that are overlapped to form spliced joints. At the ends of the cylinder, made up of these sections, are placed end links 7 preferably cast of angle iron cross sections. Long nut-equipped tie-bolts 8 are passed through the lapped perforated ends 6 of the drum sections and through the vertical flanges of the end links 7 and are provided with nuts at their outer ends, which, when tightened, securely clamp all of the drum-forming elements in a very compact cylindrical arrangement. To form the V-shaped passages through the drum or cylindrical shell thus made, the sections 5 preferably have cast in one face V-shaped channels 9, which become passages when the several adjacent sections are clamped together to form the drum.

This separating drum is preferably left open at both ends, is free from spokes and is arranged to rotate on grooved wheels 10 secured to transverse shafts 11 journaled in suitable bearings 12 on the lower beams of a box-like casing 13, within which the separating drum is arranged to rotate. One of the shafts 11 is provided with a pulley 14 that adapts it to be driven by a belt, not shown. By the means just described, the separating drum is not only supported for rotation around its own axis but is arranged to be frictionally driven.

To deliver the grain or material to be separated, against the upwardly moving surface of the separating drum, the casing 13 is provided with a hopper or supply spout 15 that opens directly against the perforated surface of the drum and delivers thereto through a lateral passage 16. Here it will be noted that the end links 7 project radially considerably beyond the outer surface of the separating drum or cylinder, so as to prevent the thin layer of grain from runing off at the ends of the drum.

Within the drum is a hopper or receptacle 17 that underlies a considerable part of the upper portion of the drum and is provided with an inclined discharge spout 18 that delivers from the drum out through one side of the casing. The hopper and drum are shown as integrally formed and provided with flanges 19 bolted or riveted to one side of the casing so as to thereby support said hopper and spout in the positions shown in the drawings.

At the downwardly moving side of the separating drum or cylinder is a hopper-like receiving spout 20, which, as shown, opens through the bottom of the casing.

The separator described will best be understood by considering the action thereof in the separation of wheat and oats. The manner in which the commingled wheat and oats will be delivered from the hopper or spout 15 directly against the outer surface of the upwardly moving portion of the separating drum is obvious. It is evident that both wheat and oats will get into the outer portions of the passages 9 and be carried upward by the drum. When the loaded passages pass over the hopper 17, the wheat, because of its size and length, will pass downward through the bands in the passages 9 and completely through said passages and will fall into said hopper, while the oats, being too long to make the trip through the belts of said passages, will be carried onward until the outer portions of said passages, at the downwardly moving side of the drum, are substantially inverted or turned downward and outward and then the oats will be discharged outwardly through the same extremities of the passages from which they enter and will drop into the hopper 20, or, at any rate, from the drum at the exterior thereof. Thus, the separation of wheat and oats may be effectually accomplished.

In the drawings, I have illustrated what I at present believe to be the preferred embodiment of my invention, but it will, of course, be understood that the separator is capable of very considerable modification, all within the spirit of my invention as herein disclosed and claimed.

While, for the sake of concrete illustration, the separator has been especially described in its use for the separation of wheat and oats, it will, nevertheless, be understood that it is capable of very general use for the separation of objects that have different lengths or major dimensions, but approximately the same diameters or minor dimensions. The machine is highly efficient for the separation, for example, of mustard from wheat, peas from wheat, and barley from oats.

Of course, for each kind of work, the angular or V-shaped passages will have to be made of the right size, but the size may be readily determined by a little experience. The said passages should, of course, be of such size and angle that the one class of articles will pass through the same, while the other class of objects will not pass through the same, and, hence, will be discharged backward out from the same extremities through which they enter.

What I claim is:

1. A separator comprising a separating shell provided with approximately V-shaped angular passages extended therethrough from one surface to the other thereof, and means for moving said separating surface so as to cause the same to alternately reverse its opposite surfaces in respect to top and bottom, said V-shaped passages having such angular bends that relatively long material such as oats will not pass therethrough and relatively short material such as wheat will pass therethrough.

2. The structure defined in claim 1 in combination with means for maintaining the commingled mass of separable material against an upwardly moving portion of the outer surface of said separating shell.

3. A separator comprising a cylindrical shell arranged to rotate and having approximately V-shaped passages extended through the same from the outer to the inner surface thereof.

4. A separator comprising a cylindrical shell arranged to rotate and having approximately V-shaped passages extended through the same from the outer to the inner surface thereof, said drum being mounted for its rotary movement on an approximately horizontal axis, and means for thus rotating said drum, said V-shaped passages having such angular bends that relatively long material such as oats will not pass therethrough and relatively short material such as wheat will pass therethrough.

5. A separator comprising a cylindrical shell arranged to rotate on an approximately horizontal axis and having approximately V-shaped passages extended through the same from the outer to the inner surface thereof, and means for maintaining a supply of commingled separable material against the outer surface of the upwardly moving portion of said drum, said V-shaped passages having such angular bends that relatively long material such as oats will not pass therethrough and relatively short material such as wheat will pass therethrough.

6. The structure defined in claim 5 in further combination with a hopper supported within said drum and arranged to catch the material passed through the passages of said drum and to deliver the same out of said drum.

7. The structure defined in claim 5 in further combination with a hopper supported within said drum and arranged to catch the material passed through the passages of said drum and to deliver the same out of said drum, and a receptacle for the outwardly discharged material, located at the downwardly moving side of said drum at the exterior thereof.

8. The structure defined in claim 3 in which said separating drum is made up of a plurality of rings, each ring comprising a plurality of circumferentially extended and interconnected sections.

9. The structure defined in claim 3 in which said separating drum is made up of a plurality of rings, each ring comprising a plurality of circumferentially extended and interconnected sections, the said sections having V-shaped grooves cast therein and open at one side by forming the V-shaped passages in the drum when the sections thereof are assembled.

10. The structure defined in claim 3 in which said drum is provided at its ends with rings that project radially outward beyond the cylindrical shell and afford flanges for retaining the material on the upwardly moving portion of the drum.

11. The structure defined in claim 3 in which said separating drum is made up of a plurality of rings, each ring comprising a plurality of circumferentially extended and interconnected sections and also comprising end rings that project radially beyond the outer surface of the separating drum.

In testimony whereof, I affix my signature.

WILLIAM P. BUCHAN.